Patented Oct. 24, 1922.

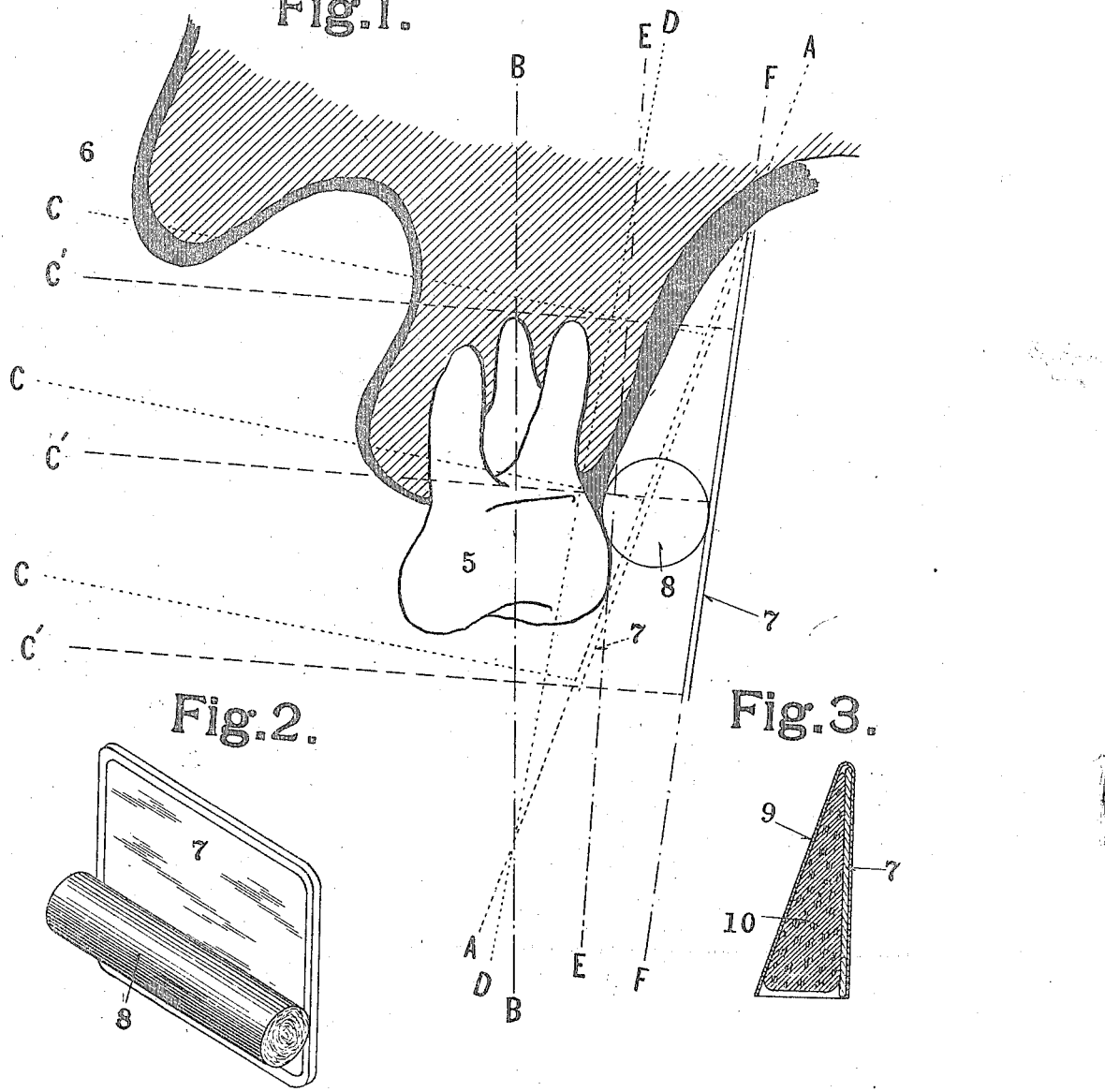

1,433,464

UNITED STATES PATENT OFFICE.

COLLINS A. LE MASTER, OF ST. LOUIS, MISSOURI.

DENTAL RADIOGRAPH DEVICE.

Application filed March 17, 1921. Serial No. 452,958.

*To all whom it may concern:*

Be it known that I, COLLINS A. LE MASTER, a citizen of the United States of America, residing at the city of St. Louis, State of Missouri, United States of America, have invented a certain new and useful Dental Radiograph Device, of which the following is such a full, clear, and exact description as will enable any one skilled in the art to which it appertains to make and use the same, reference being had to the accompanying drawings, forming part of this specification.

In order that dental radiographs or X-ray reproductions of dental areas may have the desired diagnostic value, it is highly desirable that the normal ray be perpendicular to the plane bisecting the angle formed between the tooth and the film. Any deviation from the perpendicular by the normal ray will result in a distorted image. Much difficulty has heretofore been encountered in radiographing the upper posterior dental region for the reasons that if the normal ray is perpendicular to the bisecting plane above referred to, the zygomatic process will often cast a shadow upon the roots of the tooth. It has been customary heretofore to avoid this difficulty by allowing the normal ray to strike the bisecting plane at an angle other than a right angle and afterwards to reconstruct the distorted image thus formed by elaborate calculation so as to secure a chart or diagram having the proper diagnostic value.

It is the object of the present invention to avoid the shadows cast by the zygomatic arch and at the same time to maintain the normal ray perpendicular to the plane bisecting the angle between the tooth and film. This I accomplish by providing the film holder with a radiolucent abutment determining a bearing plane at an angle to the plane of the film.

In the accompanying drawings which illustrate two forms of devices made in accordance with my invention, Figure 1 is a diagrammatic view of the upper dental region showing the third molar, Figure 2 is a perspective view of one form of holder and Figure 3 is a sectional view showing another form of holder.

5 indicates the third upper molar and 6 the zygomatic process. 7 indicates a film holder which may be of any usual construction. This film holder has usually been placed as shown by dotted line in Figure 1 lying in the plane indicated by the line "A," the lower edge bearing against the crown of the tooth and the upper edge against the palate. B indicates the plane determined by the axis of the tooth 5. It will be evident that if the normal rays C strike the bisecting plane (indicated by D) at right angles to said plane the zygomatic process 6 will cast a shadow upon the root of the tooth.

As has been heretofore stated, it is usual to shift the normal ray so as to avoid the shadow on the roots of the tooth. Such shifted rays are indicated by the line C'. In carrying out my invention, I provide the film holder 7 with a radiolucent abutment 8 that is, an abutment of material through which the X-rays can pass with a sufficient freedom to allow of the formation of a photographic image. This abutment as shown in Figures 1 and 2 is formed of a roll of absorbent cotton cemented or otherwise secured to the film holder. This abutment determines a bearing plane at an angle to the plane F of the film. In this manner I so shift the plane of the holder with respect to the axis of the tooth that the bisecting plane indicated by the line E—E will be perpendicular to rays, such for instance as the rays C'—C' hereinbefore referred to, which are so situated as not to cast a shadow of the zygomatic process of the roots of the tooth.

In Figure 3, I have shown a modification in which the film holder 7 is contained in an envelope 9, preferably of paper which also encloses a wedge shaped abutment 10. This abutment may be of cork or similar radiolucent material. This form of my device is used in exactly the same manner as the form hereinbefore described.

Having fully described my invention what I claim as new and desire to secure by Letters Patent of the United States is:

1. In a device of the class described, the combination with a film holder, of a radiolucent abutment carried by said holder and determining a bearing plane at an angle to the plane of the film.

2. In a device of the class described, the combination with a film holder, of a radiolucent envelope for said holder, and a radiolucent abutment enclosed in said holder and determining a bearing plane at an angle to the plane of the film.

3. In a device of the class described, the combination with a film holder, of a radiolucent envelope for said holder, and a radiolucent wedge-shaped abutment enclosed in said holder and determining a bearing plane at an angle to the plane of the film.

In testimony whereof, I have hereunto set my hand and affixed my seal.

COLLINS A. LE MASTER, D. D. S. [L. S.]